United States Patent
Sidders et al.

(10) Patent No.: US 10,259,272 B2
(45) Date of Patent: Apr. 16, 2019

(54) ASSEMBLY FOR A CENTRAL TIRE INFLATION SYSTEM

(71) Applicant: DANA HEAVY VEHICLE SYSTEMS GROUP, LLC, Maumee, OH (US)

(72) Inventors: Jason M. Sidders, Perrysburg, OH (US); Lloyd G. Racine, Lamoure, ND (US); William J. Foor, Clayton, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 8 days.

(21) Appl. No.: 14/392,404

(22) PCT Filed: Dec. 23, 2014

(86) PCT No.: PCT/US2014/072037
§ 371 (c)(1),
(2) Date: May 13, 2016

(87) PCT Pub. No.: WO2015/103018
PCT Pub. Date: Jul. 9, 2015

(65) Prior Publication Data
US 2016/0288589 A1   Oct. 6, 2016

Related U.S. Application Data

(60) Provisional application No. 61/923,461, filed on Jan. 3, 2014.

(51) Int. Cl.
*F16K 15/20*   (2006.01)
*B60C 23/00*   (2006.01)

(52) U.S. Cl.
CPC ............ *B60C 23/003* (2013.01); *F16K 15/20* (2013.01); *Y10T 137/36* (2015.04); *Y10T 137/7808* (2015.04)

(58) Field of Classification Search
CPC ............ Y10T 137/36; Y10T 137/7784; Y10T 137/7808
See application file for complete search history.

(56) References Cited

U.S. PATENT DOCUMENTS 2,010,250 A   8/1935   Appelgate
2,141,543 A   12/1938  Mann, Jr.
(Continued)

FOREIGN PATENT DOCUMENTS

DE   102008062066 A1   6/2010
DE   102008062072 A1   6/2010
(Continued)

OTHER PUBLICATIONS

European Patent Office, The International Search Report and Written Opinion, issued in PCT/US2014/072037, dated Mar. 5, 2015, 9 pages, European Patent Office, Rijswijk, Netherlands.
(Continued)

*Primary Examiner* — Robert K Arundale
(74) *Attorney, Agent, or Firm* — Marshall & Melhorn, LLC (57) ABSTRACT

An assembly for a central tire inflation system includes a first housing having a first end and a hose member provided in the first end. A valve assembly is in fluid communication with the hose member via the first housing. The valve assembly includes a second housing and a valve positioned within the second housing. The second housing includes a base portion which comprises a lower wall portion. The valve is biased towards the lower wall portion by a biasing member to open the valve assembly.

14 Claims, 7 Drawing Sheets

(56) References Cited

U.S. PATENT DOCUMENTS

| | | | |
|---|---|---|---|
| 2,944,579 A | 7/1960 | Kamm et al. | |
| 3,276,503 A | 10/1966 | Kilmarx | |
| 3,456,676 A | 7/1969 | Stuck | |
| 3,489,166 A | 1/1970 | Williams | |
| 3,542,062 A | 11/1970 | Zahid | |
| 3,724,488 A | 4/1973 | Featherstone | |
| 3,747,626 A | 7/1973 | Valentino | |
| 3,789,867 A | 2/1974 | Yabor | |
| 3,890,999 A * | 6/1975 | Moskow | G05D 16/103 137/484.4 |
| 3,995,656 A * | 12/1976 | Mills, Jr. | G05D 7/012 137/497 |
| 4,171,119 A | 10/1979 | Lamson | |
| 4,269,223 A | 5/1981 | Carter et al. | |
| 4,480,580 A | 11/1984 | Nalence | |
| 4,641,698 A | 2/1987 | Bitonti | |
| 4,685,501 A | 8/1987 | Williams | |
| 4,724,879 A | 2/1988 | Schultz et al. | |
| 4,744,399 A | 5/1988 | Magnuson et al. | |
| 4,765,385 A | 8/1988 | McGeachy | |
| 4,768,574 A | 9/1988 | Probst | |
| 4,895,199 A | 1/1990 | Magnuson et al. | |
| 4,922,946 A | 5/1990 | Boulicault | |
| 5,029,604 A | 7/1991 | Spektor et al. | |
| 5,181,977 A | 1/1993 | Gneiding et al. | |
| 5,253,687 A | 10/1993 | Beverly et al. | |
| 5,261,471 A | 11/1993 | Freigang et al. | |
| 5,293,919 A | 3/1994 | Olney et al. | |
| 5,411,051 A | 5/1995 | Olney et al. | |
| 5,413,159 A | 5/1995 | Olney et al. | |
| 5,587,698 A | 12/1996 | Genna | |
| 5,647,927 A | 7/1997 | Mason | |
| 5,713,386 A | 2/1998 | Heredia | |
| 6,142,168 A | 11/2000 | Sumrall | |
| 6,209,350 B1 | 4/2001 | Kimble | |
| 6,250,327 B1 | 6/2001 | Freignang et al. | |
| 6,302,138 B1 | 10/2001 | Sumrall | |
| 6,374,852 B1 | 4/2002 | Olivas | |
| 6,427,714 B2 | 8/2002 | Freigang et al. | |
| 6,561,017 B1 | 5/2003 | Claussen et al. | |
| 6,604,414 B1 | 8/2003 | Claussen et al. | |
| 6,634,375 B2 | 10/2003 | Olivas et al. | |
| 6,758,088 B2 | 7/2004 | Claussen et al. | |
| 6,865,930 B1 | 3/2005 | Claussen et al. | |
| 6,868,719 B1 | 3/2005 | Claussen et al. | |
| 6,880,598 B2 | 4/2005 | Haunhorst et al. | |
| 6,943,673 B2 | 9/2005 | Skoff et al. | |
| 7,032,611 B1 | 4/2006 | Sheng | |
| 7,051,585 B2 | 5/2006 | Claussen et al. | |
| 7,079,047 B2 | 7/2006 | Boulot | |
| 7,188,638 B1 | 3/2007 | Peach | |
| 7,191,796 B1 | 3/2007 | Rehmert, Jr. | |
| 7,437,920 B2 | 10/2008 | Beverly et al. | |
| 7,493,808 B2 | 2/2009 | Milanovich et al. | |
| 7,509,969 B2 | 3/2009 | Huang | |
| 7,686,051 B2 | 3/2010 | Medley et al. | |
| RE41,756 E | 6/2010 | Claussen | |
| 8,113,234 B2 | 2/2012 | Campau | |
| 8,136,561 B2 | 3/2012 | Sandoni et al. | |
| 8,256,447 B2 | 9/2012 | Badstue et al. | |
| 8,307,868 B2 | 11/2012 | Medley et al. | |
| 8,307,869 B2 | 11/2012 | Medley et al. | |
| 8,353,311 B2 | 1/2013 | Rigamonti et al. | |
| 8,356,620 B2 | 1/2013 | Colussi et al. | |
| 8,596,560 B2 | 12/2013 | Morgan et al. | |
| 8,844,596 B2 | 9/2014 | Medley et al. | |
| 9,296,264 B2 | 3/2016 | Mozingo | |
| 9,308,788 B2 | 4/2016 | Fazekas | |
| 9,403,410 B2 | 8/2016 | Mozingo | |
| 2002/0134428 A1 | 9/2002 | Gabelmann | |
| 2002/0157701 A1 | 10/2002 | Sampson | |
| 2003/0075219 A1 * | 4/2003 | Carroll | G05D 16/103 137/505.25 |
| 2007/0023083 A1 | 2/2007 | Huang | |
| 2008/0223457 A1 | 9/2008 | Kobziar et al. | |
| 2009/0032619 A1 | 2/2009 | Morgan et al. | |
| 2011/0057138 A1 * | 3/2011 | Maus | F16K 17/10 251/357 |
| 2011/0174394 A1 * | 7/2011 | Kristoffersen | G05D 7/0133 137/505 |
| 2011/0221261 A1 | 9/2011 | Eaton et al. | |
| 2011/0272618 A1 | 11/2011 | Mosler et al. | |
| 2011/0308637 A1 | 12/2011 | Tsiberidis | |
| 2011/0315235 A1 | 12/2011 | Colefax et al. | |
| 2012/0138826 A1 | 6/2012 | Morris et al. | |
| 2013/0240060 A1 | 9/2013 | Morgan et al. | |
| 2013/0276902 A1 | 10/2013 | Medley et al. | |
| 2013/0282232 A1 | 10/2013 | Medley et al. | |
| 2015/0165846 A1 | 6/2015 | Sidders | |

FOREIGN PATENT DOCUMENTS

| | | |
|---|---|---|
| EP | 0206949 A1 | 12/1986 |
| FR | 1432885 | 3/1966 |
| FR | 2149276 | 3/1973 |
| FR | 2619762 A1 | 3/1989 |
| GB | 410531 | 5/1934 |
| GB | 646891 | 11/1950 |
| GB | 1037494 | 7/1966 |
| GB | 1346130 | 2/1974 |
| GB | 2312268 A | 10/1997 |
| WO | 9114120 | 9/1991 |
| WO | 2002062595 | 8/2002 |
| WO | 2004030952 | 4/2004 |
| WO | 2010094067 | 8/2010 |
| WO | 2011/028346 A1 | 3/2011 |
| WO | 2014028142 | 2/2014 |
| WO | 2015103018 | 7/2015 |

OTHER PUBLICATIONS

European Patent Office, International Search Report and Written Opinion issued in International Application No. PCT/US2017/015275, dated May 30, 2017, 12 pages, European Patent Office, Rijswijk Netherlands.

European Patent Office, International Search Report and Written Opinion issue in International Application No. PCT/US2013/049915, dated Dec. 5, 2013, 13 pates, European Patent Office, Rijswijk Netherlands.

* cited by examiner

ASSEMBLY FOR A CENTRAL TIRE INFLATION SYSTEM

CROSS-REFERENCE TO RELATED APPLICATION

This application is claiming the benefit, under 35 U.S. C. 119(e), of the provisional application which was granted Ser. No. 61/923,461 filed on Jan. 3, 2014, the entire disclosure of which is hereby incorporated by reference.

BACKGROUND OF THE INVENTION

The invention relates to an assembly and, more particularly, to an assembly for a central tire inflation system.

Vehicles which have central tire inflation systems employ wheel valves to retain air in their wheels and adjust or maintain the pressure thereof. Conventional wheel valves may suffer from performance issues due to the range of temperatures they operate in, the operating pressures they are exposed to and/or the specialized functions they are designed to perform.

Therefore, it would be advantageous to develop an assembly that is inexpensive, operable in an increased temperature range at higher pressures and can be used with an existing wheel valve to overcome the aforementioned limitations of the wheel valve.

BRIEF SUMMARY OF THE INVENTION

Embodiments of an assembly for a central tire inflation system are provided.

In an embodiment, the assembly comprises a first housing having a first end and a hose member provided in the first end. The assembly also comprises a valve assembly in fluid communication with the hose member via the first housing. The valve assembly comprises a second housing and a valve positioned within the second housing. The second housing includes a base portion which comprises a lower wall portion. The valve is biased towards the lower wall portion by a biasing member to open the valve assembly.

In another embodiment, the assembly comprises a first housing having first end attached to a first end portion. The first end portion has an outer diameter which is substantially constant and greater than an outer diameter of a second end portion. A hose member is provided in the first end of the first housing. A valve assembly is in fluid communication with the hose member via the first housing. The valve assembly comprises a second housing and a valve positioned within the second housing. The second housing is attached to the first housing via the second end portion and includes a base portion. The base portion comprises a lower wall portion. The valve is biased towards the lower wall portion by a biasing member to open the valve assembly.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

Various embodiments of an assembly 10, 10A are described herein. The embodiments of the assembly 10, 10A may have applications to commercial and off-highway vehicles. Also, it would be understood by one of ordinary skill in the art that these embodiments could have industrial, locomotive, military and aerospace applications.

Figure 1:
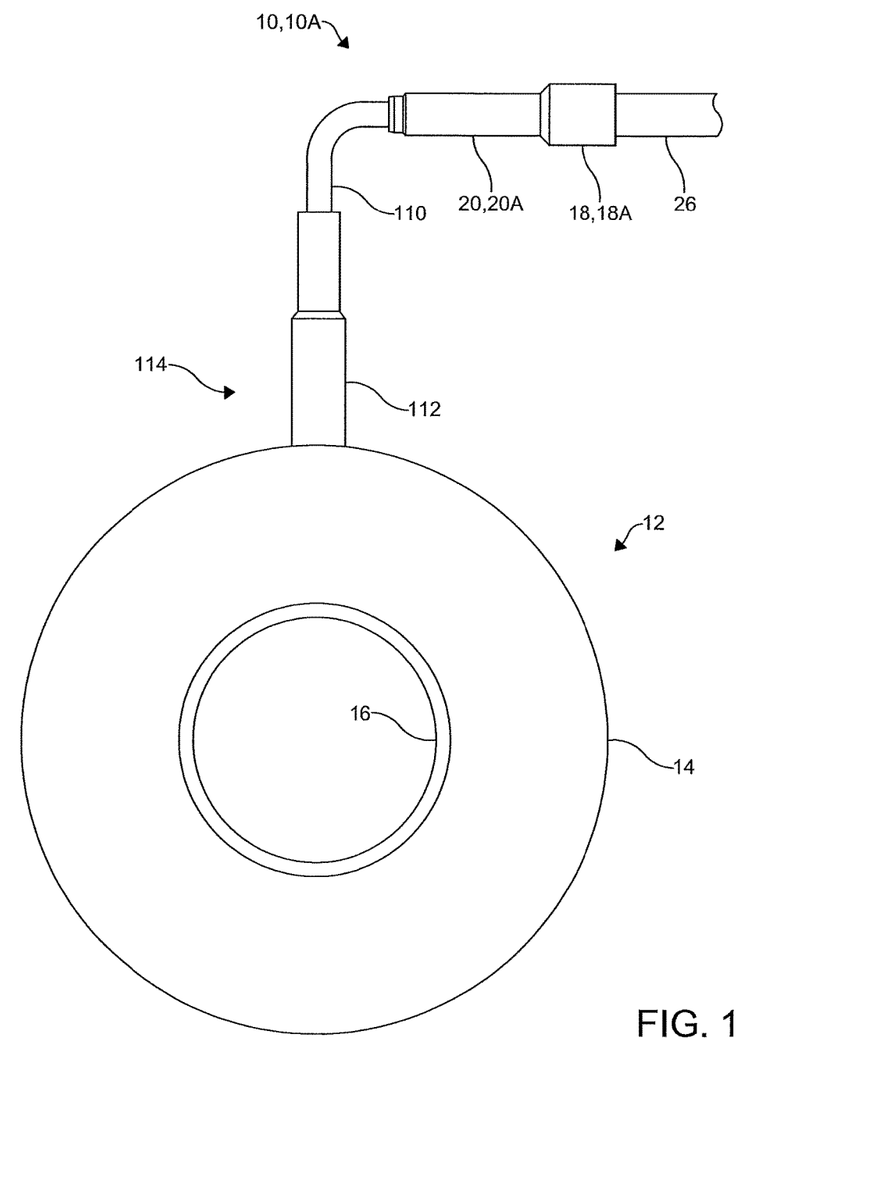
FIG. 1 depicts a plan view of embodiments of an assembly in accordance with the invention
Figure 2:
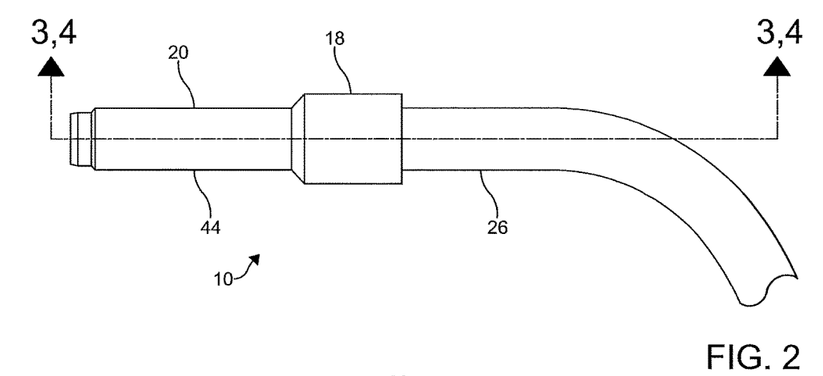
FIG. 2 depicts an enlarged plan view of an embodiment of the assembly of FIG. 1.

Referring now to FIG. 1, the assembly 10, 10A is preferably utilized in or as a portion of a central tire inflation system (CTIS) to check, increase and/or decrease the pressure of a fluid housed within a wheel 12. The wheel 12 is formed by sealingly attaching a tire 14 to an outer surface of a wheel rim 16. Tires and wheel rims which are conventional in the art are suitable for use with the assembly 10, 10A. The wheel 12 houses a pressurized fluid that is in a gaseous state and is, preferably, air at a pressure from about 2 to 125 psi. More preferably, the air is at a pressure from about 5 to 125 psi. The pressure of the fluid housed within the wheel 12 may also be referred to herein as "tire pressure."

The central tire inflation system preferably comprises an inflation system conduit (not depicted) in selective fluid communication with a fluid supply (not depicted) and/or the wheel 12 via the assembly 10, 10A. The inflation system conduit is utilized to communicate fluid from the fluid supply or the wheel 12. The fluid supply provides pressurized fluid when it is desired to check, increase and/or decrease the tire pressure. The pressurized fluid provided by the fluid supply is at a pressure that is greater than the tire pressure. The pressurized fluid provided by the fluid supply may be at a pressure of 125 psi or more.

Embodiments of the assembly 10, 10A will now be described with reference to FIGS. 1-10.

The assembly 10, 10A comprises a first housing 18, 18A and a second housing 20, 20A. The first housing 18, 18A and the second housing 20, 20A are preferably each metallic.

However, it should be understood that the first housing and/or the second housing may be formed utilizing other materials. The first housing 18 and the second housing 20 may be formed in a unitary manner as is shown in the embodiments illustrated in FIGS. 2-6. In other embodiments like the ones illustrated in FIGS. 7-9, the first housing 18A and second housing 20A are attached together but are provided as separate components.

The first housing 18, 18A comprises a first end 22 attached to a first end portion 24. A hose member 26 is provided in the first end 22 and is attached to the first end portion 24 of the first housing 18, 18A. The first housing 18, 18A also comprises a second end portion 28, 28A which is directly attached to a cap portion 30, 30A of the second housing 20, 20A. In certain embodiments, the second end portion 28A is attached to the cap portion 30A via a threaded connection 32.

In an embodiment, the first end portion 24 has an outer diameter 34 which is substantially constant. The outer diameter 34 of the first end portion 24 is greater than an outer diameter 36, 36A of the second end portion 28, 28A. In certain embodiments, the second end portion 28, 28A may comprise a ramped transition 38, 38A. The ramped transition 38, 38A is attached to the first end portion 24. In the embodiments illustrated in FIGS. 7-9, the ramped transition 38A separates the first end portion 24 from a connecting portion 39 of the second end portion 28A. A tube 40, 42 is provided in and extends through the first housing 18, 18A. The tube 40, 42 enables fluid communication between the hose member 26 and a valve assembly 44. In certain embodiments, the tube 40 ends at the first end 22 of the first housing 18, 18A. In other embodiments such as those illustrated in FIG. 6, the tube 42 extends beyond the first end 22 of the first housing 18.

On an end 46, the hose member 26 is in fluid communication with the first housing 18, 18A via a fluid conduit 48 provided therethrough. The fluid conduit 48 extends through the hose member 26 and is in fluid communication with the tube 40, 42 provided through the first housing 18, 18A to enable fluid communication between the hose member 26 and the first housing 18, 18A. On an opposite end (not depicted), the hose member 26 and fluid conduit 48 are in fluid communication with the remaining portion of the central tire inflation system via the inflation system conduit. In the embodiment shown in FIG. 6, the hose member 26 may be attached to the tube 42 of the first housing 18 via a compression fitting (not depicted) provided near the end 50 of the tube 42. In other embodiments like those illustrated in FIGS. 2-5 and 7-9, the hose member 26 is attached to the first housing 18, 18A by a crimping process which provides a crimp (not depicted) in the first end portion 24.

On an opposite end 52 of the first housing 18, 18A, the tube 40, 42 is in fluid communication with the valve assembly 44 via a perforation 54 formed in the second housing 20, 20A. The second housing 20, 20A is provided as a portion of the valve assembly 44. Preferably, the second housing 20, 20A comprises a base portion 56 and a cap portion 58, 58A. The valve assembly 44 also comprises a biasing member 60 and a valve 62 positioned within the second housing 20, 20A.

The base portion 56 is a generally cylindrical member into which the cap portion 58, 58A, biasing member 60 and valve 62 are disposed. As best illustrated in FIGS. 3-5 and 8, the base portion 56 comprises an outer wall portion 64, a lower wall portion 66, and a stem portion 68. Preferably, the base portion 56 is unitarily formed by casting a metal. However, it should be understood that the base portion 56 may be formed using other materials and processes. It should also be understood that the base portion 56 may be formed by joining a plurality of components.

The outer wall portion 64 is of a generally cylindrical shape. The outer wall portion 64 is attached to the lower wall portion 66 at a first end 70 thereof and extends away therefrom. The outer wall portion 64 and the lower wall portion 66 define a base cavity 72. Preferably, the outer wall portion 64 comprises an inner surface 74 which includes a groove 76 formed therein. Preferably, the groove 76 is formed in a first diameter portion 78 of the inner surface 74. The inner surface 74 also comprises a second diameter portion 80. The groove 76 may be formed in the second diameter portion 80. The second diameter portion 80 has a diameter which is greater than a diameter of the first diameter portion 78. In certain embodiments, a ramped transition 82 connects the first diameter portion 78 and the second diameter portion 80. However, in other embodiments (not depicted), the transition between the first diameter portion and the second diameter portion is sharply defined. As illustrated, the second diameter portion 80 is attached to an end of the base portion 56. In still other embodiments like the on illustrated in FIG. 8, the inner surface 74 may also comprise a third diameter portion 86. In these embodiments, the third diameter portion 86 is separated from the second diameter portion 80 by the first diameter portion 78 and the third diameter portion 86 is attached to the end 70 of the outer wall portion 64. The third diameter portion 86 has a diameter which is less than the diameter of the first diameter portion 78.

An outer surface 88 of the outer wall portion 64 may be knurled. In other embodiments (not depicted), the outer surface may include a thread portion formed thereon for engaging a thread formed in a component the assembly is coupled to. In an embodiment, the outer surface 88 of the outer wall portion 64 is of a substantially constant diameter.

The lower wall portion 66 is attached to the outer wall portion 64 on a side and the stem portion 68 on an opposite side thereof. The lower wall portion 66 is in a perpendicular relationship with both the outer wall portion 64 and the stem portion 68. The lower wall portion 66 defines a perforation 90 formed in the base portion 56, which hereinafter may also be referred to herein as the "base perforation." The base perforation 90 extends through the lower wall portion 66 and allows the base cavity 72 to communicate with a stem cavity 92.

The base perforation 90 is shaped to militate against pressure losses that occur as fluid flows through an orifice constriction and to set a relative flow rate of the fluid that enters the base cavity 72 or the stem cavity 92. The base perforation 90 has a diameter 94 which is of a length that varies radially and may be of a generally hourglass shape. Alternatively, the base perforation 90 may be of another shape that militates against pressure losses that occur as a fluid flows through an orifice constriction. In an embodiment, the diameter 94 of the base perforation 90 varies from a first end 96 adjacent the base cavity 72 to a second end 98 adjacent the stem cavity 92. In this embodiment, it is preferred that the diameter 94 of the base perforation 90 gradually decreases in length from the first end 96 to a reduced diameter in a center portion 100 of the lower wall portion 66 and then gradually increases in length along a remaining portion of the lower wall portion 66 to the second end 98. In other embodiments (not depicted), the varying diameter of the base perforation may be defined by a pair of circular fillets formed in the lower wall portion or by other conic sections.

The stem portion 68 is of a generally cylindrical shape and a portion thereof forms a first end 102 of the second housing 20, 20A. The stem portion 68 is attached to the lower wall portion 66 at a first end 104 thereof and extends away therefrom. The lower wall portion 66 and the stem portion 68 define the stem cavity 92. In an embodiment like the one shown in FIG. 5, an inner surface 106 of the stem portion 68 includes a groove 108 formed therein for engaging a filter (not depicted) and/or a seal member (not depicted) disposed in the stem cavity 92. The seal member provides a seal between the assembly 10 and a conduit 110 or a valve stem 110 of a wheel valve 114. In an embodiment, the seal member is a ring-shaped face seal. In another embodiment, the inner surface 106 includes a thread portion (not depicted) for engaging a thread portion formed on the conduit 110 or valve stem 112.

Figure 3:
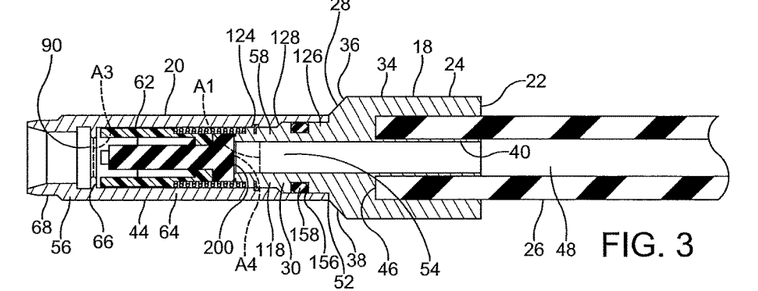
FIG. 3 depicts a sectional view of the assembly of FIG. 2 taken along line 3-3.
Figure 4:
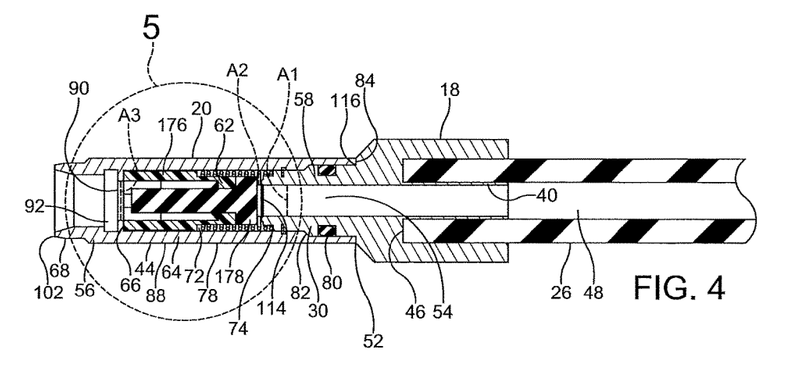
FIG. 4 depicts a sectional view the assembly of FIG. 2 taken along line 4-4.
Figure 5:
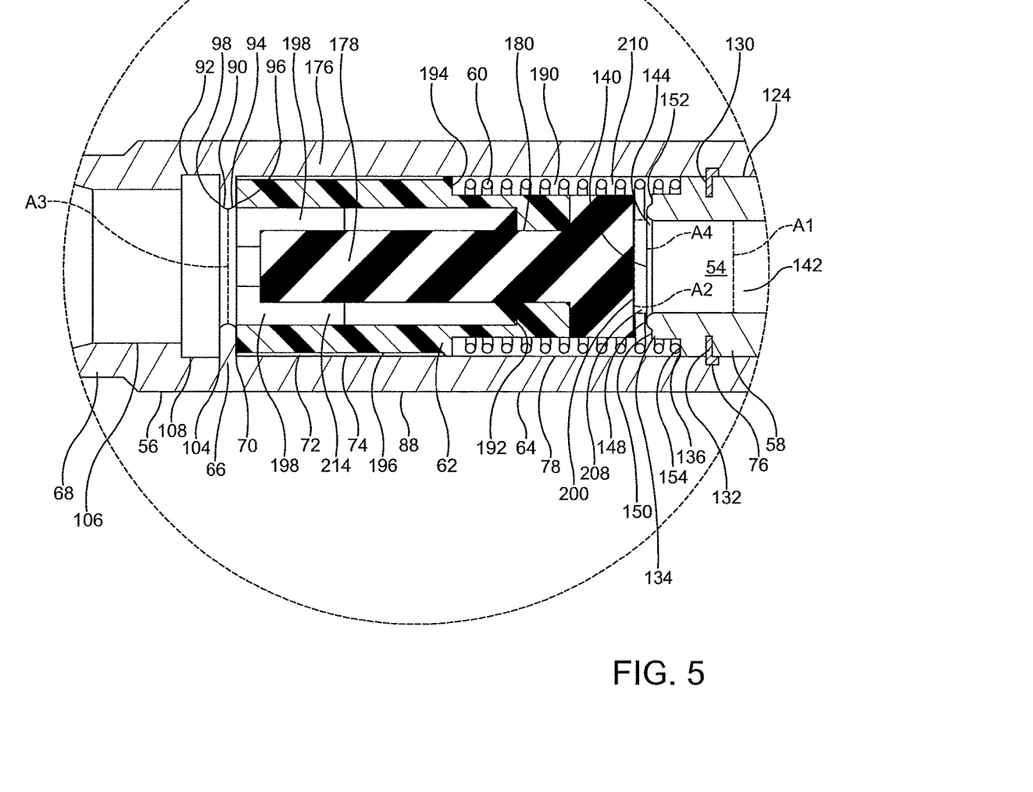
FIG. 5 depicts an enlarged view of a portion of FIG. 4.

The inner surface 106 may increase in diameter adjacent the first end 102 of the second housing 20, 20A to provide a guide for the conduit 110 or valve stem 112 for engagement with the stem portion 68. As illustrated in FIGS. 3-5, the inner surface 106 may gradually increase in diameter to the first end 102 of the second housing 20.

The wheel valve 114 is in fluid communication with the wheel 12 on an end and directly with the assembly 10, 10A on an opposite end or with the assembly 10, 10A via the conduit 110. The wheel valve 114 may comprise the valve stem 112 and a valve (not depicted) positioned within the valve stem 112. In an embodiment, the valve is of the Schrader variety.

The stem portion 26 is attached to the conduit 110 or the valve stem 112 so that fluid communication between the wheel 12 and assembly 10, 10A is available via the wheel valve 114. In certain embodiments, the valve is removed from the wheel valve 114 prior to attaching the assembly 10, 10A. In embodiments where the valve body is not removed, the assembly 10, 10A may comprise a member (not depicted) to actuate the valve body to allow for fluid communication between the wheel 12 and assembly 10, 10A.

The cap portion 58, 58A is disposed within and secured to the base portion 56. An end of the cap portion 58, 58A forms a second end 116, 116A of the second housing 20, 20A. The second end 116, 116A of the second housing 20, 20A is provided on an end of the valve assembly 44 opposite the first end 102 of the second housing 20, 20A.

The cap portion 58, 58A comprises an inboard portion 118, a wall portion 134 and the perforation 54, which hereinafter may also be referred to herein as the "cap perforation." The cap perforation 54 is formed through the inboard portion 118 and wall portion 134, respectively. Preferably, the cap portion 58, 58A is unitarily formed by casting a metal. However, it should be understood that the cap portion 58, 58A may be formed using other materials and processes. It should also be understood that the cap portion 58, 58A may be formed by joining a plurality of components.

The inboard portion 118 is disposed within the base portion 56 and comprises an outer surface 122 which abuts the inner surface 74 of the base portion 56. The inboard portion 118 comprises a first diameter portion 124 and a second diameter portion 126. The first diameter portion 124 is connected to the second diameter portion 126 by an intermediate diameter portion 128. Preferably, an outer diameter of the second diameter portion 126 is greater than an outer diameter of the first diameter portion 124. The outer diameter of the second diameter portion 126 is also greater than an outer diameter of the intermediate diameter portion 128. Further, it is preferred that the outer diameter of the intermediate diameter portion 128 is greater than the outer diameter of the first diameter portion 124. Thus, the inboard portion 118 decreases in diameter from the second diameter portion 126 to the intermediate diameter portion 128 and from the intermediate diameter portion 126 to the first diameter portion 124.

The first diameter portion 124 of the cap portion 58, 58A abuts the first diameter portion 78 of the inner surface 74 of the base portion 56. In an embodiment, a first annular groove 130 is provided in the first diameter portion 124 and is aligned with the groove 76 in the inner surface 74 of the base portion 56. A locking member 132 is engaged with the grooves 76, 130 to secure the base portion 56 to the cap portion 58, 58A. The locking member 132 is preferably C-shaped.

The wall portion 134 is attached to the first diameter portion 124 on an end thereof. The wall portion 134 is substantially ring-shaped. The wall portion 134 and the inner surface 74 of the base portion 56 define a groove 136. The groove 136 is an annular recess which receives a second member end of the biasing member 60. The wall portion 134 defines a portion of the cap perforation 54 which is formed therethrough.

The cap perforation 54 is aligned with the base perforation 90. The cap perforation 54 is shaped to militate against pressure losses that occur as a fluid flows through an orifice constriction and to set a relative flow rate for the fluid as it is directed through the assembly 10, 10A. The cap perforation 58 is formed through the cap portion 58, 58A. A first end 138 of the cap portion 58, 58A is in fluid communication with the tube 40, 42 and a second end 140 is in fluid communication with the valve 62 when the valve assembly 44 is closed. The cap perforation 54 has a first portion 142 which has a diameter of a length that is substantially constant and a second portion 144 which has a diameter of a length which varies. The first portion 142 is preferably of a cylindrical shape. The second portion 144 is defined by a rounded portion 146 of the wall portion 134 and gradually increases in diameter to a ridge 148 provided on an inboard face 150, 150A of the wall portion 134.

The diameter of the second portion 144 is greater than the diameter of the first portion 142. Alternatively, the cap perforation may be of or defined by other shapes that militate against pressure losses that occur as a fluid flows through an orifice constriction. For example, in an embodiment (not depicted), the second portion may be defined by a pair of circular fillets formed in the wall portion and the inboard face. In still other embodiments (not depicted), the first portion and/or second portion may be defined by other conic sections. Furthermore, it should be understood that the wall portion may include at least one additional feature to facilitate applying a pressurized fluid to the base cavity. In certain embodiments (not depicted), the at least one additional feature may be one of a hollow cylindrical protuberance extending from the wall portion, a thread formed in the wall portion, or a fitting adapted to receive a coupling.

The ridge 148 is formed about and abuts the second end 140 of the cap perforation 54. The ridge 148 is shaped to militate against pressure losses that occur as a fluid flows through an orifice constriction. Preferably, the ridge 148 is an annular body and is hemispherical in cross-section. However, it should be appreciated that the cross-sectional shape of the ridge may be of another shape.

The inboard face 150, 150A comprises a first surface 152. The first surface 152 is an annular portion that is attached to the ridge 148. In the embodiments shown in FIGS. 2-6, the first surface 152 separates the ridge 148 from the groove 136. In this embodiment, the inboard face 150 also comprises a second surface 154 which defines a portion of the groove 136. Preferably, the first surface 152 and second surface 154 are attached to each other in a manner which provides the inboard face 150 with a sharply defined edge portion.

Figure 6:
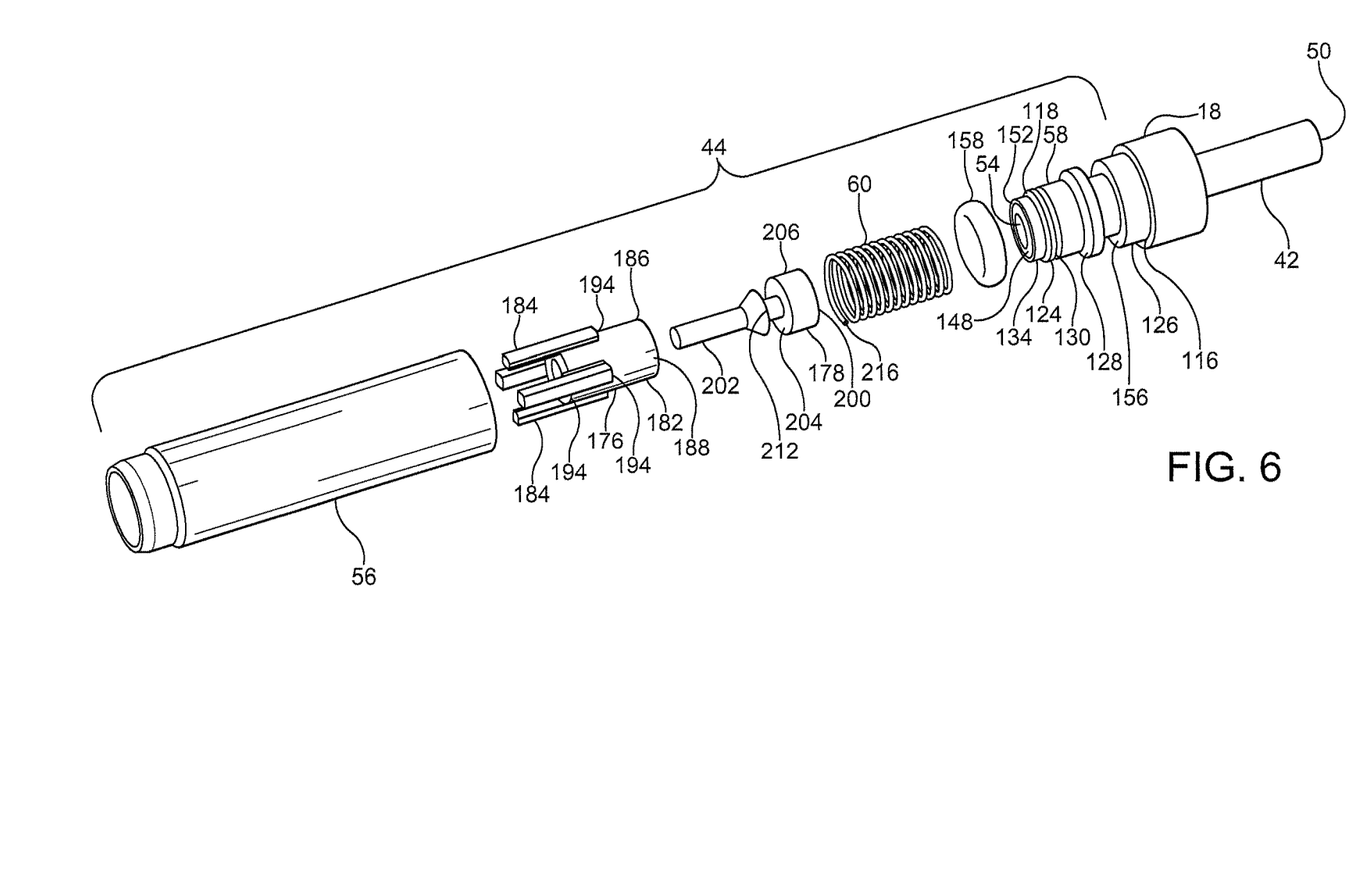
FIG. 6 depicts an exploded view of an alternative embodiment of a portion of the assembly of FIG. 2.
Figure 9:
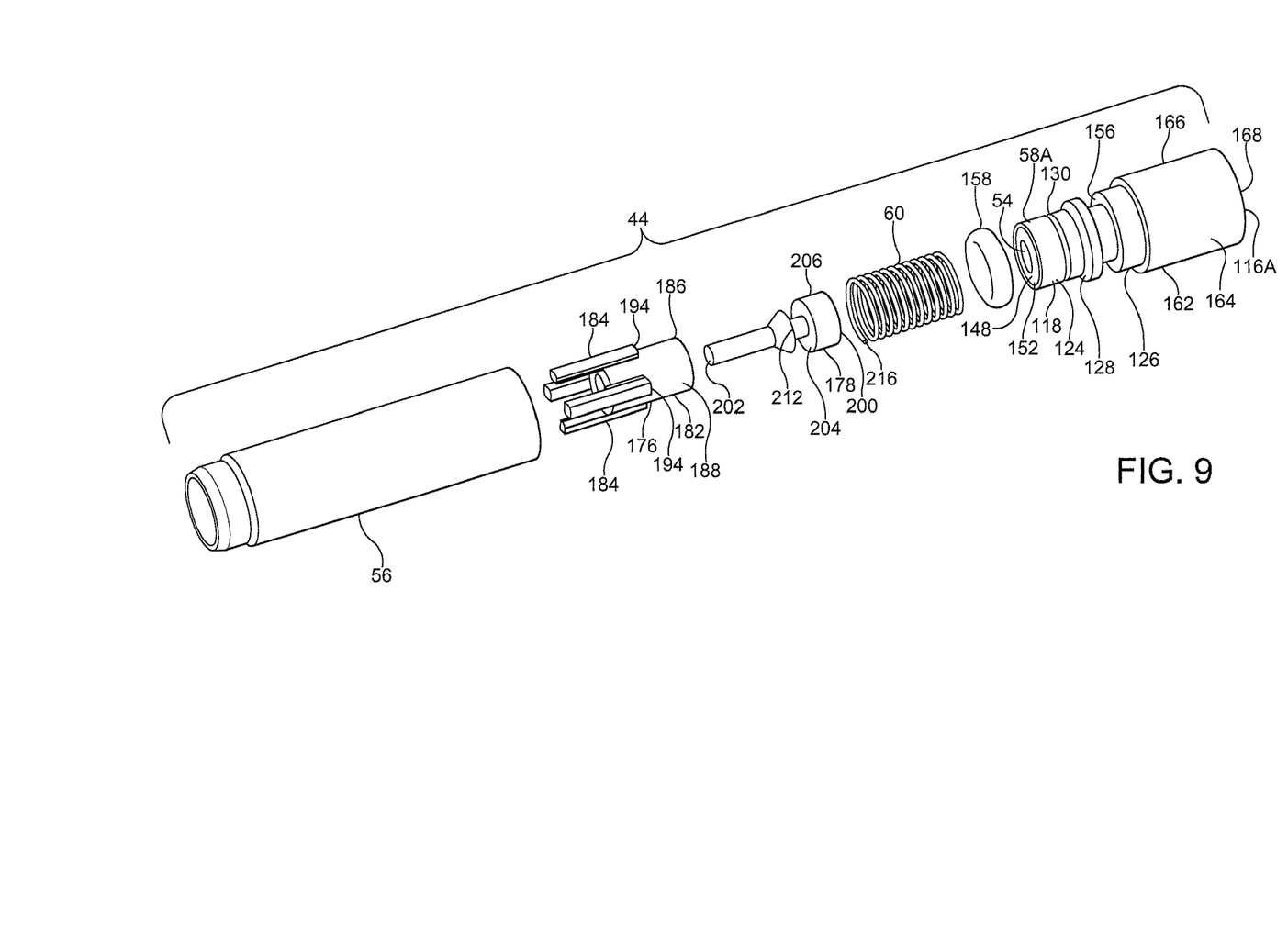
FIG. 9 depicts an exploded view of an embodiment of a portion of the assembly of FIG. 7.
Figure 10:
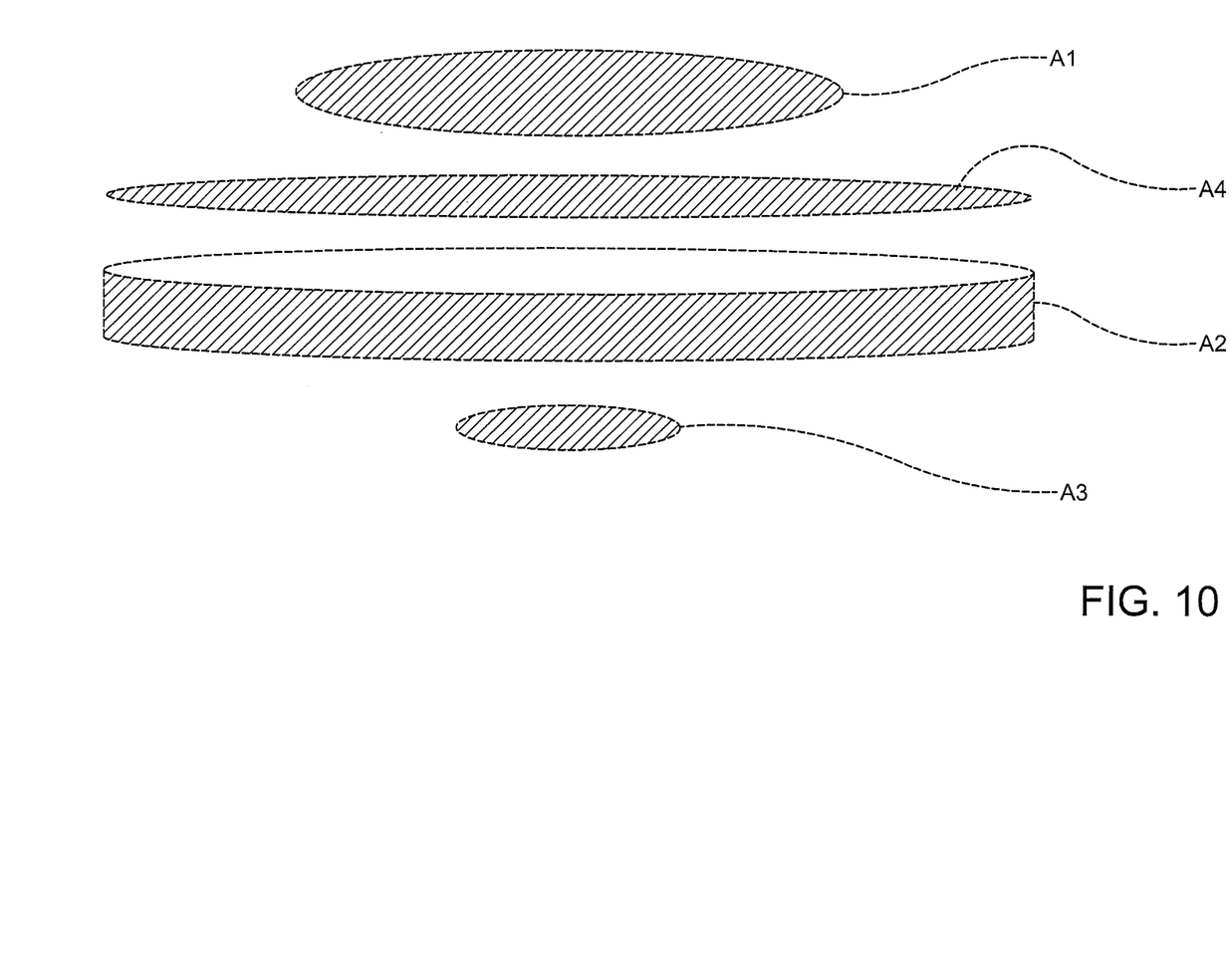
FIG. 10 depicts a perspective view of certain areas within the embodiments of the assembly of FIGS. 2 and 7.

As best shown in FIGS. 6 and 9, the second diameter portion 126 is attached to the second diameter portion 80 of the inner surface 74. A second annular groove 156 is formed in the second diameter portion 126. A seal is provided between the cap portion 30, 30A and base portion 56 to prevent fluid loss therebetween. The seal is provided by disposing a sealing member 158 in the second annular groove 156. The sealing member 158 has an annular shape and is formed of rubber or another suitable material. In an embodiment, the sealing member 158 is an O-ring.

Figure 7:
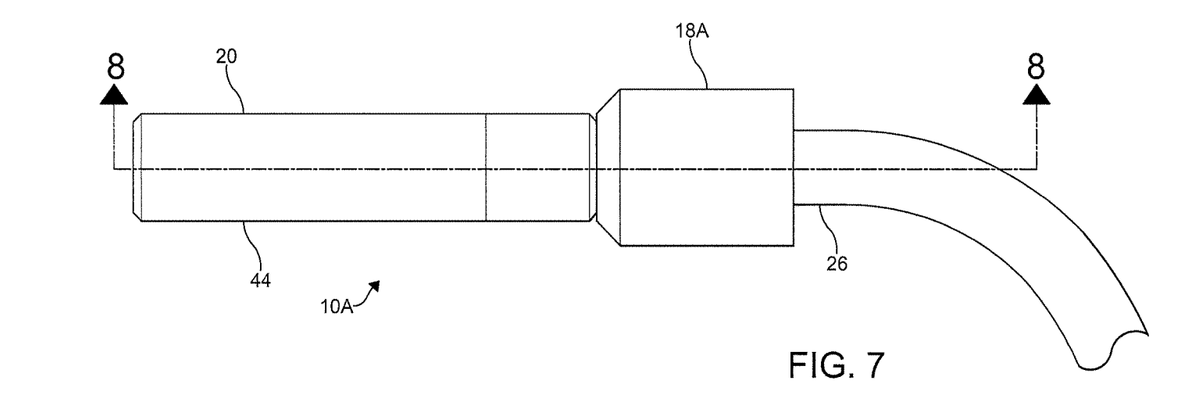
FIG. 7 depicts an enlarged plan view of an embodiment of the assembly of FIG. 1.
Figure 8:
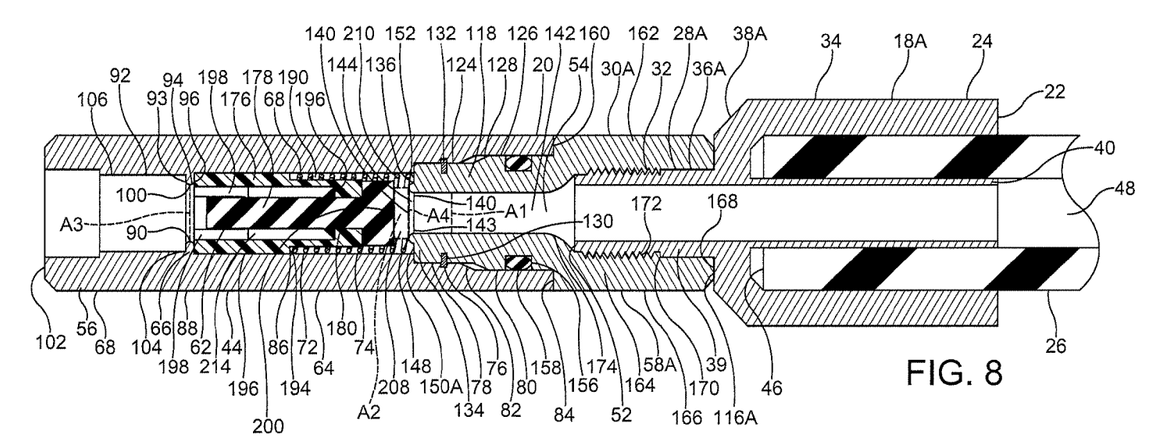
FIG. 8 depicts a sectional view of the assembly of FIG. 7 taken along line 8-8.

In certain embodiments like those shown in FIGS. 7-9, the inboard portion 118 is attached on an end 160 to an outboard portion 162. Preferably, the inboard portion 118 and outboard portion 162 are aligned. The outboard portion 162 is disposed at the end 84 of the base portion 56. The outboard portion 162 comprises an outer wall portion 164. The outer wall portion 164 comprises an outer surface 166 which has a substantially cylindrical shape. An end 168 of the outboard portion 162 defines the second end 116A of the second housing 20A. The outboard portion 162 comprises a receiving portion 170 which includes an aperture 172 which comprises a threaded portion for receiving the connecting portion 39 and attaching the first housing 18A to the second housing 20A via the threaded connection 32. The cap perforation 54 extends into the outboard portion 162 to communicate with the tube 40. In the embodiment illustrated in FIG. 8, the cap perforation 54 includes a rounded portion 174 and gradually increases in diameter to the end 52 of the first housing 20A.

Referring now to FIGS. 3-6 and 8-9, the valve 62 comprises a shuttle 176 and a plug member 178 attached to the shuttle 176. The plug member 178 is engaged with the shuttle 176 via an aperture 180 formed in the shuttle 176. The valve 62 is disposed in the base cavity 72 and is biased towards the lower wall portion 66 by the biasing member 60.

The shuttle 176 comprises a main portion 182 and a plurality of shuttle supports 184. Preferably, the shuttle 176 is unitarily formed by injection molding a thermoplastic, preferably polyoxymethylene, such as that sold by E.I. DuPont de Nemours and Company under the trademark Delrin®. However, it should be appreciated that the shuttle 176 may be formed using other materials and processes. For example, the shuttle may be formed by machining a metal. It should also be appreciated that the shuttle may be formed by joining a plurality of components.

The main portion 182 is a substantially cylindrically-shaped body. However, it should be appreciated that the main portion may be formed of other shapes. The main portion 182 comprises an outer edge 186 that is sharply defined. A definition of the outer edge 186 may be defined by the process used to form the shuttle 176. The outer edge 186 is shaped to increase a drag force applied to the valve 62 by a fluid flowing adjacent thereto. The main portion 182 defines the aperture 180. An outer surface 188 of the main portion 182 has a diameter smaller than that of the inner surface 74 of the base portion 56 adjacent thereto. A space between the outer surface 188 of the main portion 182 and the outer wall portion 64 forms a portion of a fluid passage 190 which exists when the valve 62 is in the open position. A first side 192 of the main portion 182 faces the lower wall portion 66.

The shuttle supports 184 are equally spaced apart and attached to the outer surface 188 and the first side 192 of the main portion 182. Preferably, each shuttle support 184 is generally wedge-shaped or a rectangular-shaped body. However, it should be appreciated that the shuttle supports may be shaped differently or be of another shape. Each of the shuttle supports 184 comprises an upper edge 194 that is sharply defined. A definition of the upper edges 194 may be defined by the process used to form the shuttle supports 184. The upper edges 194 are shaped to increase a drag force to the valve 62 by a fluid flowing adjacent thereto.

The shuttle supports 184 define an outer diameter 196 of the shuttle 176. An end of each of the shuttle supports 184 abuts the lower wall portion 66 when the valve 62 is in a fully open position. When the valve 62 is in an open position, spaces 198 between successive shuttle supports 184 form a portion of the fluid passage 190.

The plug member 178 is formed from a resilient material. The plug member 178 comprises a sealing surface 200 and a base 202. A retaining groove 204 is provided between the sealing surface 200 and the base 202. The plug member 178 may be unitarily formed. However, it should be appreciated that the plug member 178 may be formed from a plurality of components.

The sealing surface 200 is formed in a distal end of the plug member 178, which is opposite a distal end of the plug member 178 formed by the base 202. The sealing surface 200 is of a circular shape and is preferably flat. However, it is understood that the sealing surface 200 may be of another shape. The sealing surface 200 is sharply defined by an outer edge 206. The outer edge 206 is shaped to decrease a flow rate of the fluid flowing adjacent thereto when the valve 62 is in an open position. The outer edge 206 may be defined by the process used to form the sealing surface 200.

The valve 62 is moveable from the closed position to the fully open position and between the closed position and the fully open position and vice versa to allow fluid communication between the hose member 26 and the wheel 12. The sealing surface 200 is disposed adjacent the second end 140 of the cap perforation 54 and abuts and sealingly contacts the ridge 148 so as to be in sealing contact therewith when the valve 62 is in the closed position. As shown best in FIGS. 5 and 8, when the valve 62 is in an open position, a space 208 separates the ridge 148 and the sealing surface 200. When the valve 62 is in the fully open position, each of the shuttle supports 184 abuts the lower wall portion 66. Under certain conditions, the valve 62 may be in an open position and positioned between the closed position and the fully open position. In these embodiments, a space is provided between ends of the shuttle supports 184 and the lower wall portion 66 and a space between the ridge 148 and the sealing surface 200 is provided. Also, when the valve 62 is in an open position as is shown best in FIGS. 5 and 8, the edge portion of the inboard face 150, 150A and an adjacent portion of the sealing surface 200 provide a portion 210 within the assembly 10, 10A where the flow rate of the fluid is reduced when compared with other portions of the assembly 10, 10A such as, for example, adjacent the ends 96, 98 of the base perforation 90 or adjacent the second end 140 of the cap perforation 54 and ridge 148.

The base 202 may have a generally hemispherical shape (not depicted) or elongated cylindrical shape. However, it should be appreciated that the base may be of another shape. At least a portion 212 of the base 202 has a diameter which is of a length that is greater than that of the retaining groove 204. An area between the base 202 and the shuttle 174 defines a shuttle cavity 214. The shuttle cavity 214 is shaped to increase a drag force applied to the valve 62 by a fluid flowing adjacent thereto.

The retaining groove 204 separates the sealing surface 200 and the base 202 and is defined by the area therebetween. The plug member 178 is attached to the shuttle 176 by engaging the main portion 182 and the retaining groove 204. To assemble the valve 62, the base 202 is compressed and directed through the aperture 180 and the main portion 182 is aligned with the retaining groove 204.

The biasing member 60 is disposed between the base portion 56 and the cap portion 58, 58A adjacent the cap perforation 54. The biasing member 60 contacts the shuttle 176 and applies a force thereto. Preferably, the biasing member 60 applies the force to the shuttle 176 via contact with the plurality of shuttle supports 120. In this embodiment, a first member end 216 of the biasing member 60 abuts each of the shuttle supports 184 and the second member end abuts the cap portion 58, 58A.

The biasing member 60 is preferably a compression spring such as, for example, a coil spring formed from a spring steel. However, it should be appreciated that the biasing member 60 may be of another kind, type, make and/or formed from another material. The biasing member 60 is pretensioned. To open the valve 62, the biasing member 60 biases the valve 62 towards the lower wall portion 66.

In an embodiment, the assembly 10, 10A also comprises the filter The filter is utilized to prevent dirt and/or debris in the wheel from entering the assembly 10, 10A. The filter may be conventional in the art. Preferably, the filter is attached to the base portion 56 by a portion thereof. Preferably, the filter is disposed in the groove 108 formed in the stem portion 68.

In FIG. 3, the valve 62 is illustrated in the closed position. In the closed position, the fluid passage 190 through the assembly 10, 10A is not provided. When the valve 62 is in an open position such as, for example, the fully open position, which is shown best in FIGS. 5 and 8, the fluid passage 190 is provided through the assembly 10, 10A. The fluid passage 190 comprises the cap perforation 54, base perforation 90, the space between the ridge 148 and the valve 62, space between the valve 62 and the outer wall portion 164, and one or more of the spaces 198 between the shuttle supports 184. The fluid passage 190 also comprises the tube 40, 42 and the fluid conduit 48 provided through the hose member 26.

When a pressure differential between the pressure within the inflation system conduit and the tire pressure is above an opening threshold, the valve 62 is in or placed in an open position. A relationship between an area A4 (hereinafter referred to as the fourth area and shown best in FIG. 10), the spring rate of the biasing member 60, and the pressure differential between the pressure within the inflation system conduit and the tire pressure determines the opening threshold and facilitates placing the valve 62 in an open position. Preferably, the opening threshold is about 5 psi or more. More preferably, the opening threshold is about 5 to about 8 psi. The assembly 10, 10A may be configured so that the valve 62 has a specific opening threshold. The valve 62 remains in an open position so long as the pressure differential between the pressure within the inflation system conduit and the tire pressure is above the opening threshold. In an open position, the sealing surface 200 does not contact the cap portion 58, 58A which allows a flow of the pressurized fluid past the valve 62 from the base perforation 90 to the cap perforation 54 through the fluid passage 190 or from the cap perforation 54 to the base perforation 90 through the fluid passage 190. In the embodiments illustrated, the fourth area A4 is defined by the sealing surface 200 and the ridge 148 when the valve 62 is in the closed position and is of an unbroken circular shape.

When a pressure differential between the tire pressure and the pressure within the inflation system conduit is above a closing threshold, the valve 62 is in or placed in the closed position, which is shown in FIG. 3. Preferably, the closing threshold is about 5 to about 8 psi. The assembly 10, 10A may be configured so that the valve 62 has a specific closing threshold. In the closed position, the plug member 178 sealingly contacts the cap portion 58, 58A which prevents a flow of the pressurized fluid from the cap perforation 54 to the base perforation 90 or vice versa. The valve 62 remains in the closed position until the tire inflation system determines that the tire pressure needs to be checked and/or adjusted.

Referring now to FIGS. 3, 4, 8 and 10, a relationship between an area A1 (hereinafter referred to as the first area) of the cap perforation 54, an area A2 (hereinafter referred to as the second area) between the sealing surface 200 and the ridge 148 when the valve 62 is in an open position which corresponds to an area of a side of a right cylinder and an area A3 (hereinafter referred to as the third area) of the reduced diameter of the base perforation 90 determines the closing threshold and facilitates placing the valve 62 in the closed position. The first area A1 must be greater than the second area A2, and the third area A3 must be greater than the second area A2 to obtain a desirable closing threshold for use with the tire inflation system. Preferably, the third area A3 is about 1.1 times greater than the second area A2 and the first area A1 is about 3.8 times greater than the second area A2. Such a selection of the areas A1, A2, and A3 results in the closing threshold of about 5 to about 8 psi. As above-discussed, when the valve 62 is in an open position, one or more spaces 198 between the shuttle supports 184 forms a portion of the fluid passage 190. A total cross sectional area of the spaces 198 between supports 184 is about equal to the first area A1. Also, as illustrated best in FIG. 10, the fourth area A4 is larger than the first area A1.

Advantageously, the assembly 10, 10A can operate in an efficient manner at a wider range of pressures than the known designs. For example, the assembly 10, 10A can operate at a fluid supply pressure and/or a tire pressures of about 5 psi to 125 psi. Further, the assembly 10, 10A does not suffer from diminished performance under certain ambient temperature conditions which is observed in the known designs. For example, placing the valve 62 in an open position or the closed position is not affected by low temperature conditions. Additionally, after the tire pressure is increased or decreased, the valve 62 can be placed in the closed position quickly to provide a desired tire pressure.

As noted above, the assembly 10, 10A is utilized in a tire inflation system to check, increase and/or decrease the tire pressure. The assembly 10, 10A may be utilized to increase or decrease the tire pressure to a selected tire pressure. For example, the tire pressure may be selected by an operator of the vehicle and be from about 5 to 125 psi.

When it is desired to check, increase and/or decrease the tire pressure, the valve 62 is placed in an open position so that the wheel 12 is in fluid communication with the assembly 10, 10A via the wheel valve 114 and base perforation 90 and the inflation system conduit is provided in fluid communication with the assembly 10, 10A via the cap perforation 54, the tube 40, 42 and the fluid conduit 48 provided through the hose member 26.

To place the valve 62 in an open position, a force is applied thereto via the pressurized fluid from the inflation system conduit through the cap perforation 54. The drag force applied to the valve 62 and the force applied by the biasing member 60 to the shuttle 176 urges the valve 62 towards the lower wall portion 66 and causes the sealing surface 200 to no longer sealingly contact the ridge 148 which forms the space therebetween and, when the valve 62 is in the fully open position, each of the shuttle supports 184 to abut the lower wall portion 66. The force applied by the biasing member 60 to the valve 62 and from the inflation system conduit through the cap perforation 54 by the pressurized fluid from the cap perforation 54 to the fourth area A4 places the valve 62 in an open position and is greater than the force applied by tire pressure to the valve 62 through the base perforation 90. A spring rate or another characteristic of the biasing member 60 may be adjusted to facilitate placing the valve 62 in an open position when the pressurized fluid from the inflation system conduit is a predetermined amount greater than the tire pressure.

The configuration of the base perforation 90, the cap perforation 54, the ridge 148, and the shuttle 176 may also facilitate placing the valve 62 in an open position. The base perforation 90, the cap perforation 54, and the ridge 148 are shaped to militate against pressure losses that occur as a fluid flows through an orifice constriction. The outer edge 186 of the main portion 182, the upper edges 194 of the shuttle supports 184, and the shuttle cavity 214 are shaped to increase a drag force applied to the valve 62 by a fluid flowing adjacent thereto. When the fluid flows from the cap perforation 54 to the base perforation 90, the fluid applies the drag force to the valve 62. The greater the pressure within the inflation system conduit, when compared to the tire pressure, the greater the drag force that is applied to the valve 62.

When it is desired to terminate increasing or decreasing the tire pressure, the valve 62 is placed in the closed position. To place the valve 62 in the closed position, a force is applied to the valve 62 by the tire pressure through the base perforation 90. The drag force applied to the valve 62 urges the valve 62 towards the cap portion 58, 58A which causes the sealing surface 200 to sealingly contact the ridge 148. The force applied to place the valve assembly 62 into the closed position is greater than a sum of a force applied by the biasing member 60 to the valve 62 via the shuttle 176 and the force applied by the pressurized fluid from the cap perforation 54. Further, the spring rate or other characteristic of the biasing member 60 may be adjusted to facilitate placing the valve 62 into the closed position when the pressurized fluid from the base perforation 90 is a predetermined amount greater than the pressurized fluid from the cap perforation 54.

The configuration of the base perforation 90, cap perforation 54, ridge 148, shuttle 176 and plug member 178 also facilitate placing the valve 62 in the closed position. The base perforation 90, cap perforation 54 and the ridge 148 are shaped to militate against pressure losses that occur as a fluid flows through an orifice constriction. The outer edge 186 of the main portion 182, the upper edges 194 of the shuttle supports 184, and the shuttle cavity 214 are shaped to increase a drag force applied to the valve 62 by a fluid flowing adjacent thereto. When the fluid flows from the base perforation 90 to the cap perforation 54, the fluid applies the drag force to the valve 62. The greater the tire pressure relative to the pressure within the inflation system conduit, the greater the drag force that is applied to the valve 62.

When the valve 62 is in an open position, the inflation system conduit is in fluid communication with the wheel 12 via the assembly 10, 10A and wheel valve 114. Fluid in the inflation system conduit may be at a pressure which is greater or less than the tire pressure. When it is desired to increase the tire pressure, the fluid in the inflation system conduit is at a pressure which is greater than the tire pressure. When it is desired to decrease the tire pressure, the tire pressure is at a pressure which is greater than the pressure that the fluid is at in the inflation system conduit.

Fluid is directed through the assembly 10, 10A via the cap perforation 54, about the valve 62 and via the base perforation 90 and vice versa. The fluid may be selectively provided at a first pressure and a second pressure within the assembly 10, 10A. When it is desired to place the valve 62 in an open position, the first pressure is preferably greater than the second pressure of the fluid. In an embodiment, the first pressure is greater than the second pressure when the pressure of the fluid in the inflation system conduit is at a pressure which is greater than the tire pressure. When it is desired to place the valve 62 in the closed position, the second pressure is preferably greater than the first pressure. In an embodiment, the second pressure is greater than the first pressure when the tire pressure is at a pressure which is greater than the pressure of the fluid in the inflation system conduit. When the tire pressure is greater than the pressure of the fluid in the inflation system conduit by 5 psi or more, the second pressure is greater than the first pressure such that the valve 62 is placed in the closed position.

The first pressure or second pressure of the fluid can be selectively provided in predetermined positions within the assembly 10, 10A. In this embodiment, the first pressure and second pressure of the fluid are exerted on separate surfaces of the valve 62. Preferably, the base portion 56, cap portion 58, 58A, and valve 62 are structured to selectively provide the first pressure between the cap portion 58, 58A and valve 62 and provide the second pressure between the base portion 56 and valve 62. Selecting the size of the first area A1, the second area A2 and the third area A3 allows the first pressure to be selectively provided between the cap portion 58, 58A and valve 62 and the second pressure to be selectively provided between the base portion 56 and valve 62. In an embodiment, the first area A1 is selected to be greater than the second area A2 and the third area A3 is selected to be greater than the second area A2. Also, in this embodiment, the first area A1 is defined by a space in the cap perforation 54, the second area A2 is defined by a space provided between the valve 62 and the cap portion 58, 58A, and the third area A3 is defined by a space in the base perforation 90.

When it is desired to place the valve 62 in an open position to check, increase and/or decrease the tire pressure, the valve 62 is urged toward the base portion 56 by forces applied by the biasing member 60 and the first pressure of the fluid. Preferably, the first pressure is greater than the second pressure of the fluid. Also, in these embodiments, the sum of the forces applied to the valve 62 by the first pressure of the fluid and the biasing member 60 are greater than that of the sum of the forces applied on the valve 62 by the second pressure of the fluid. As the valve 62 is urged toward the base portion 56, the biasing member 60 which is positioned between the cap portion 58, 58A and valve 62 extends toward the base portion 56. The biasing member 60 may extend until the shuttle supports 184 contact the base portion 56.

After the tire pressure is checked, increased and/or decreased to the desired pressure, the valve 62 is placed into the closed position by urging the valve 62 toward the cap portion 58, 58A. When it is desired to place the valve 62 in the closed position, the second pressure is greater than the first pressure of the fluid. Also, in these embodiments, the force applied on the valve 62 by the second pressure of the fluid is greater than the sum of the forces applied on the valve 62 by the first pressure of the fluid and the force applied by the biasing member 60. As the valve 62 is urged toward the cap portion 58, 58A, the biasing member 60 is compressed until the sealing surface 200 sealingly contacts the cap portion 58, 58A.

The valve 62 can be placed into the closed position from an open position so that the inflation system conduit does not communicate with the wheel 12 via the assembly 10, 10A. When this is desired, the fluid is preferably at three or more discrete flow rates within the assembly 10, 10A. In an embodiment, the fluid is at first flow rate, a second flow rate and a third flow rate. Preferably, the first flow rate is greater than the second flow rate. Also, preferably, the third flow rate is greater than the second flow rate. In other embodiments, the third flow rate is greater than the first flow rate.

Preferably, the fluid is at the first flow rate in the cap portion 58, 58A, at the second flow rate adjacent the valve 62 and at the third flow rate in the base portion 56. More preferably, the fluid in the cap perforation 54 is at the first flow rate, the fluid between the cap portion 58, 58A and valve 62 is at the second flow rate and the fluid in the base perforation 90 is at the third flow rate. The fluid in the cap perforation 54 is at the first flow rate as it passes through the first area A1, the fluid between the cap portion 58, 58A and valve 62 is at the second flow rate as it passes through the second area A2, and the fluid in the base perforation 90 is at the third flow rate as it passes through the third area A3.

Providing the fluid at the aforementioned flow rates in the aforementioned locations within the assembly 10, 10A generates discrete fluid pressures within the assembly 10, 10A. Preferably, the fluid is at the first pressure between the cap portion 58, 58A and valve 62 and the second pressure between the base portion 56 and the valve 62. The second pressure applies a force on the valve 62 which is opposite the force applied on the valve 62 by the biasing member 60 and the first pressure. In an embodiment, the force applied by the second pressure is greater than the sum of the other forces applied on the valve 62 which enables the valve 62 to close. In this embodiment, the second pressure may be greater than the first pressure by 5 psi or more.

To place the valve 62 in the closed position, the valve 62 is urged toward the cap portion 58, 58A by the third pressure. When the plug member 178 sealingly contacts the ridge 148, the valve is closed. When the valve 62 is closed, fluid communication through the assembly 10, 10A is prevented.

To form the assembly 10, 10A, the biasing member 60 and valve 62 are disposed in the base portion 56. Next, the locking member 132 is disposed in the first annular groove 130 and the cap portion 58, 58A is inserted into the base portion 56 which compresses the locking member 132 until the grooves 76, 130 are aligned. Once the grooves 76, 130 are aligned, the resilience of the locking member 132 allows the locking member 132 to engage the groove 76 in the inner surface 74 and the first annular groove 132 to secure the base portion 56 to the cap portion 58, 58A. Next, the hose member 26 can be attached to the first housing 18, 18A by a crimping operation or the like.

In accordance with the provisions of the patent statutes, the present invention has been described in what is considered to represent its preferred embodiments. However, it should be noted that the invention can be practiced otherwise than as specifically illustrated and described without departing from its spirit or scope.

What we claim is:

1. An assembly for a central tire inflation system, comprising:
    a first housing having a first end;
    a hose member provided in the first end; and
    a valve assembly in fluid communication with the hose member via the first housing, the valve assembly comprises a second housing and a valve positioned within the second housing, the second housing includes a base portion which comprises a lower wall portion, the valve is biased towards the lower wall portion by a biasing member to open the valve assembly, wherein the valve comprises a shuttle and a plug member attached to the shuttle and the shuttle comprises a plurality of shuttle supports, the biasing member biasing the valve via contact with the plurality of shuttle supports.

2. The assembly defined by claim 1, wherein the second housing also includes a cap portion, which is attached to the base portion via a locking member disposed in a first annular groove formed in the cap portion, and a sealing member, which is disposed in a second annular groove formed in the cap portion to provide a seal between the cap portion and the base portion.

3. The assembly defined by claim 1, wherein a second end portion of the first housing is directly attached to a cap portion of the second housing.

4. The assembly defined by claim 1, wherein the lower wall portion defines a base perforation and the base perforation has a diameter that gradually decreases from a first end of the perforation to a center portion of the perforation and gradually increases from the center portion to a second end of the perforation.

5. The assembly defined by claim 1, wherein the valve is moveable from a closed position to a fully open position and vice versa.

6. The assembly defined by claim 1, wherein the hose member comprises a fluid conduit which is in fluid communication with a perforation formed in the valve assembly via a tube provided through the first housing.

7. The assembly defined by claim 2, wherein the cap portion comprises a wall portion and a cap perforation formed through the wall portion, the biasing member being disposed adjacent the perforation, and the cap perforation gradually increases in diameter to a ridge provided on an inboard face of the wall portion.

8. The assembly defined by claim 1, wherein the plug member comprises a circular sealing surface which is separated from an elongated cylindrical base by a retaining groove that is engaged with a portion of the shuttle.

9. The assembly defined by claim 3, wherein the second end portion of the first housing is attached to the cap portion of the second housing via a threaded connection.

10. The assembly defined by claim 3, wherein the first housing and the cap portion are formed in a unitary manner.

11. The assembly defined by claim 3, wherein the cap portion has an inboard portion which is disposed within the base portion and decreases in diameter from a second diameter portion to an intermediate diameter portion and from the intermediate diameter portion to a first diameter portion.

12. The assembly defined by claim 5, wherein the valve is moveable between the closed position and the fully open position to allow fluid communication between the hose member and a wheel.

13. The assembly defined by claim 7, wherein valve is in sealing contact with the ridge and an area is defined by a surface of the valve and the ridge, wherein the area is larger than an area defined by a space positioned within the cap perforation and is of an unbroken circular shape.

14. The assembly defined by claim 1, wherein the shuttle supports are in contact with the lower wall portion when the valve is fully open.

* * * * *